Patented Nov. 19, 1935

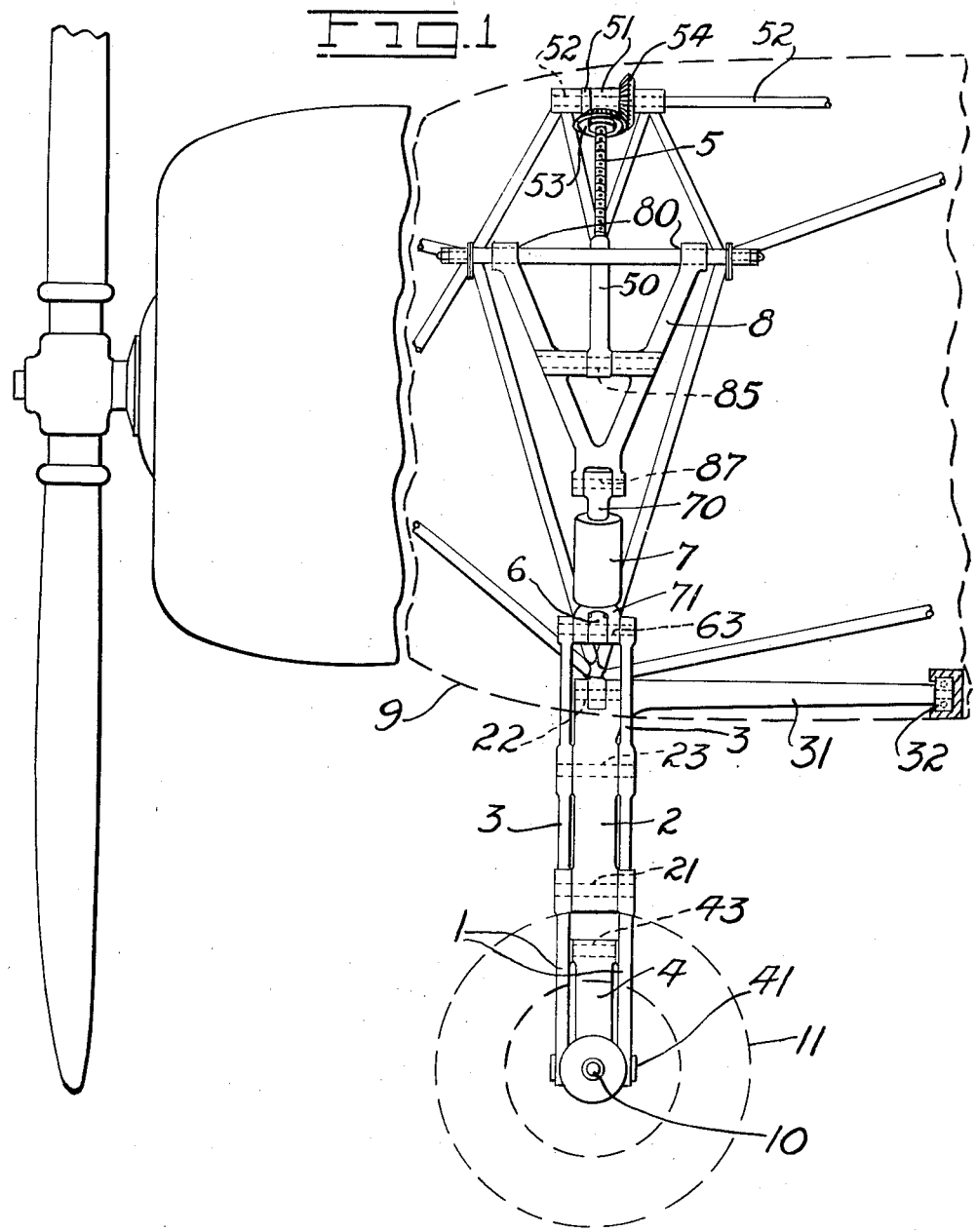

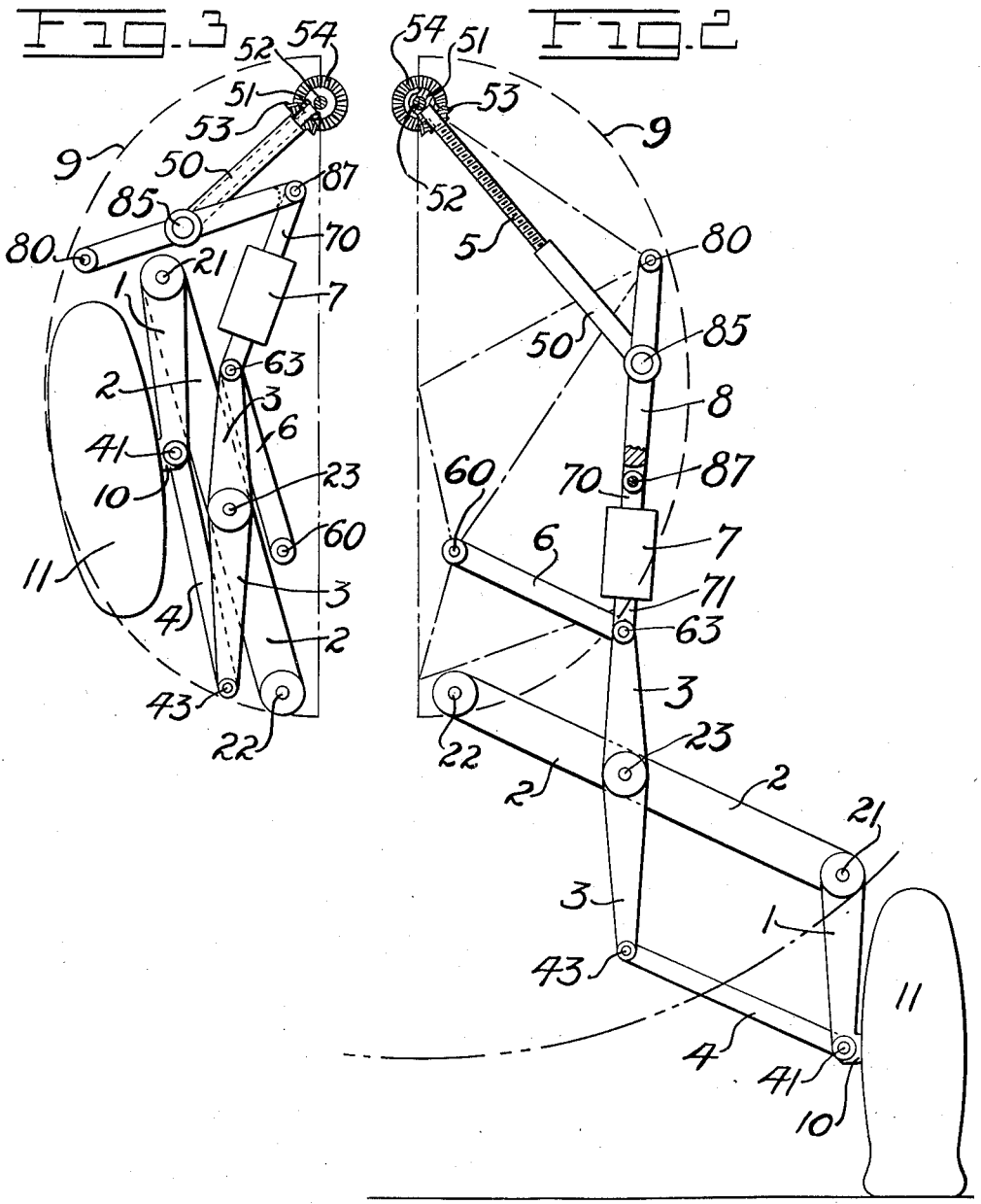

2,021,439

UNITED STATES PATENT OFFICE 2,021,439

RETRACTABLE LANDING GEAR

Edward C. Wells, Seattle, Wash., assignor to Boeing Aircraft Company, Seattle, Wash., a corporation of Washington Application September 12, 1934, Serial No. 743,671

13 Claims. (Cl. 244—2)

My invention relates to the landing gear of airplanes and the like, and is particularly designed to accomplish extension of the landing wheels to a point sufficiently below the airplane that it will give clearance to propellers longer than the usual present-day practice, yet to permit retraction of the landing gear substantially entirely within the fuselage or similar streamline part of the airplane.

The invention is particularly adaptable to small fighter planes which are intended to employ geared propellers. Such geared propellers are most efficient if longer than the normal direct-connected propeller, but such longer propellers have not heretofore been found feasible upon such fighter planes, the maximum fuselage cross section of which is small, because of the necessity of retracting the landing gear into the smallest possible space, and the difficulty, with retractable landing gears heretofore proposed, of retracting the same within the small cross section of the fuselage in a way which will not disturb the center of gravity of the airplane, nor interfere with the firing of fixed guns. While such a landing gear has been proposed in the application for patent filed in the name of John F. Haberlin, Serial No. 736,699, filed July 24, 1934, this landing gear had certain drawbacks, including particularly the location of the shock absorber unit directly upon the wheel mounting, and the necessity for providing torsion links between the two parts of this unit, so mounted. Another advantage over the Haberlin construction lies in the elimination of bends or offsets in the struts of the landing gear, so that all transverse stresses are resisted in one plane. My invention is an improvement upon the landing gear disclosed in the said Haberlin application.

One of the objects of my invention is to provide a landing gear of this general type, wherein the shock absorber unit can be at all times substantially enclosed within the fuselage, and which is so mounted that it requires no torsion links between the two parts thereof.

A further object is to eliminate the necessity for any offsetting of parts of the strut arrangement by providing a different screw arrangement for retracting and projecting the landing gear.

A further object is to provide what is in effect a set of lazy tongs constituting the strut structure, and to provide separately from this lazy tongs arrangement means for retracting and projecting the landing gear, such means preferably incorporating a shock absorbing unit, whereby the replacement or repair of parts is facilitated, and the entire assembly is strengthened substantially without increase of weight.

My invention comprises the novel combination of parts and the novel relationship of such parts to each other, as shown in the accompanying drawings, described in this specification, and as will be more particularly defined by the claims which terminate the same.

In the accompanying drawings I have shown my invention embodied in a form which is at present preferred by me.

Figure 1 is a side elevation of my landing gear, in the projected position.

Figure 2 is a transverse half section through the airplane fuselage, diagrammatically shown, illustrating my landing gear in projected position, and Figure 3 is a similar view showing the landing gear retracted.

As in the Haberlin arrangement, the basis of the present invention consists of a wheel mounting 1 and two cross struts, an inclined strut 2 and an upright strut 3. The strut 2 is fixedly pivoted at 22 upon the fuselage 9 of the airplane or any equivalent structure, a nacelle, for example, in a larger plane, and this strut, in the projected position of the landing gear, inclines outwardly and downwardly from the point 22 to a point 21, where it is pivotally connected to the upper end of the wheel mounting 1. The upright strut 3 is pivoted to the inclined strut 2 at a point 23 which is intermediate the ends of both struts. The lower end of the strut 3 is pivotally connected at 43 to a link 4, the other end of which is connected at 41 to the wheel mounting, this link extending generally parallel to the inclined strut 2. A similar link 6 is fixedly pivoted at 60 within the fuselage, and is pivotally connected at 63 to the upper end of the upright strut 3. The link 6 extends generally parallel to the inclined strut 2, so that the wheel mounting, links 4 and 6, struts 2 and 3, and the fuselage interposed between the points 60 and 22, constitute a set of lazy tongs, by means of which the wheel 11, mounted upon the spindle 10 at the lower end of the wheel mounting, may be swung upwardly and inwardly, remaining generally but not necessarily exactly parallel to its extended position, into a position within the streamlined skin of the fuselage, this skin having an aperture of about the size of the wheel 11, which is substantially filled by the wheel in its retracted position, the wheel substantially completing the streamline contour and thereby inducing a minimum of drag.

For retraction, any suitable means, suitably connected to the lazy tongs set, may be employed, and since it is desirable to provide shock absorbing means, these may be incorporated in the retracting means. Thus I have shown an oleo shock absorber, generally indicated by the numeral 7, consisting of the two relatively movable parts 70 and 71, which is connected between the point 63 and an arm 8 fixedly pivoted within the airplane structure at the point 80. The connection of the lower end of this arm 8 to the member 70 of the oleo unit is a pivotal connection, as indicated at 87. To this arm 80, at the point 85, is pivotally connected a sleeve 50 internally threaded to screw and telescope upon a rotatable screw 5. The upper end of this screw is swiveled in a fitting 51 which in turn is oscillatable about a shaft 52. A bevel pinion 53 upon the screw 5 meshes with a driving gear 54 upon the shaft 52, and by these or any similar means the screw may be rotated to retract or project the landing gear. The gear 54 may conveniently engage two pinions 53, one for each half of the landing gear, or may be duplicated, or each half may be independently operable.

Upon retraction from the position shown in Figure 2 the arm 8 is swung upward about its pivot 80, with the oleo unit 7 extended to its full extent. This pulls upward the strut 3, the member 70 hinging with respect to the arm 8 about the pivot 87. This action closes the set of lazy tongs, and the landing gear eventually comes to rest in the position shown in Figure 3.

It will be observed that the space above the screw 5, in the positions shown in Figures 2 and 3, remains sufficiently clear for the mounting, sighting and firing of a fixed gun. The retraction of the landing gear in this manner does not shift the center of gravity of the plane, but merely concentrates the weight of the landing gear more closely adjacent to this center of gravity.

It will be observed that drag stresses are taken care of by forming certain of the members of the landing gear either as V-shaped or as L-shaped members. Thus the inclined strut 2 is provided with a longitudinal extension 31, as seen in Figure 1, which lies entirely within the fuselage, and the rear end of which is provided with a suitable bearing fixed upon the fuselage, as indicated at 32. The arm 8 may be formed of V-shape, as seen in Figure 1. However, all parts of the landing gear are directly in line with the screw 5, which is the anchor for vertical stresses, and which holds the point 87 fixed in its projected position to resist landing stresses. Because the screw 5 and its sleeve 50 telescope, it is not necessary to offset any of the parts of the landing gear, as was the case in the Haberlin structure, and all such stresses are resisted in a single transverse plane.

What I claim as my invention is:

1. In combination, in a retractable landing gear, a wheel mounting, two crossed and pivotally connected struts, one end of one strut being fixedly pivoted, and its opposite end being pivotally secured to the wheel mounting, means connecting one end of the second strut to the wheel mounting, and means connecting its other end to a fixed point, to control movement of the wheel mounting in cooperation with the first strut, means connected to the aforesaid strut arrangement and movable to swing the first strut and the wheel mounting upwardly, said means including a shock absorber unit.

2. In combination, in a retractable landing gear, a wheel mounting, two crossed and pivotally connected struts, one end of one strut being fixedly pivoted, and its other end being pivotally secured to the wheel mounting, means connecting one end of the second strut to the wheel mounting, means including a compressible shock absorber interposed between the other end of the second strut and a fixed point, and means operatively connected to the aforesaid strut arrangement and movable to swing the first strut and the wheel mounting upwardly.

3. In combination with a streamlined airplane structure, a wheel mounting, two crossed and pivotally connected struts, one end of one strut being fixedly pivoted within said structure, and its other end being pivotally secured to the wheel mounting, means connecting one end of the second strut to the wheel mounting, means interposed between the other end of the second strut and a fixed point within said structure, a shock absorber unit constituting a part of the latter means, and means to displace such other end of the second strut, to move the struts and wheel mounting between an extended position, below the airplane structure, and a retracted position, inside such structure.

4. In combination with an airplane structure, a wheel mounting, a strut arrangement constituting a set of lazy tongs pivotally mounted at two fixed points upon the airplane structure, to define and move in a plane disposed transversely with respect to the line of flight, and also pivotally connected to the wheel mounting to move the same through substantially parallel positions, and means to extend and retract the lazy tongs set and the wheel mounting thereon.

5. In combination with an airplane structure, a wheel mounting, a strut arrangement constituting a set of lazy tongs pivotally mounted at two fixed points upon the airplane structure, to define and move in a plane disposed transversely with respect to the line of flight, and also pivotally connected to the wheel mounting to move the same through substantially parallel positions, and means to extend and retract the lazy tongs set and the wheel mounting thereon, said means including shock absorbing means.

6. In combination with an airplane fuselage or the like, having an aperture, a wheel mounting and a wheel thereon of a size substantially to fill said aperture, a strut arrangement constituting a set of lazy tongs pivotally mounted at two fixed points within the fuselage, and at two points upon the wheel mounting, and means to extend and retract the lazy tongs set to extend the wheel below the fuselage or to retract it wholly within the fuselage, the wheel, in the latter position, substantially closing the aperture and completing the streamline contour of the fuselage.

7. The combination of claim 6 the extending and retracting means being disposed within the fuselage, and including a shock absorber unit.

8. In combination, in a retractable landing gear, an upright wheel mounting, an inclined strut fixedly pivoted at its inner end, and in extended position extending downwardly therefrom, an upright strut pivotally connected to the inclined strut between the ends of both struts, a link extending substantially parallel to the inclined strut and connecting the lower end of the upright strut with the wheel mounting, a second link extending substantially parallel to the inclined strut and connecting the upper end of the upright strut with a fixed point, spaced above the fixed pivot of the inclined strut, and means to move the strut arrangement between an extended position, wherein the inclined strut extends downwardly from its fixedly pivoted end, and a retracted position wherein it extends upwardly adjacent the upright strut.

9. In combination with an airplane structure, a wheel mounting, a strut pivotally connected by one end to the airplane structure, along a longitudinal axis, and at its other end to the wheel mounting, and in extended position extending outwardly and downwardly, an upright strut pivotally connected between its ends to an intermediate part of the first strut, a link connecting the lower end of the upright strut and the wheel mounting, below the connection of the first strut, an arm pivotally mounted upon the airplane structure above the upper end of the upright strut, a link connecting the arm to the upper end of the upright strut, and screw and nut means anchored to the airplane structure and connected to the arm to swing the struts and wheel mounting between a projected and a retracted position.

10. The combination of claim 9, the link connecting the arm and the upright strut incorporating a shock absorber unit.

11. In combination with an airplane structure, a wheel mounting, two crossed and pivotally connected struts, one end of one strut being fixedly pivoted upon the airplane structure to swing in a plane disposed transversely with respect to the line of flight, and its other end being pivotally connected to the wheel mounting, means connecting one end of the second strut to the wheel mounting, and means including a screw disposed substantially in the plane of swing of the first strut, for moving the struts and associated parts between extended and retracted positions.

12. In combination with an airplane structure, a wheel mounting, two crossed and pivotally connected struts, one end of one strut being fixedly pivoted upon the airplane structure to swing in a plane disposed transversely with respect to the line of flight, and its other end being pivotally connected to the wheel mounting, means connecting one end of the second strut to the wheel mounting, means including a screw disposed substantially in the plane of swing of the first strut, and a shock absorber unit interposed between the other end of the second strut and the screw, for moving the struts and associated parts between extended and retracted positions.

13. In combination with an airplane structure, a wheel mounting, two crossed and pivotally connected struts, one end of one strut being fixedly pivoted upon the airplane structure to swing in a plane disposed transversely with respect to the line of flight, and its other end being pivotally connected to the wheel mounting, means connecting one end of the second strut to the wheel mounting, and means including a screw and a sleeve threaded thereupon and telescoping therewith, disposed substantially in the plane of swing of the first strut, for moving the struts and associated parts between extended and retracted positions.

EDWARD C. WELLS.